(12) United States Patent
Hwang

(10) Patent No.: US 7,616,592 B2
(45) Date of Patent: *Nov. 10, 2009

(54) METHOD OF COMMUNICATION BETWEEN MOBILE STATION AND BASE STATION IN MOBILE COMMUNICATION SYSTEM

(75) Inventor: In Tae Hwang, Gyeonggi-do (KR)

(73) Assignee: LG Electronics Inc., Seoul (KR)

( * ) Notice: Subject to any disclaimer, the term of this patent is extended or adjusted under 35 U.S.C. 154(b) by 745 days.

This patent is subject to a terminal disclaimer.

(21) Appl. No.: 10/641,302

(22) Filed: Aug. 15, 2003

(65) Prior Publication Data

US 2004/0109434 A1 Jun. 10, 2004

Related U.S. Application Data

(63) Continuation of application No. 09/280,849, filed on Mar. 30, 1999, now Pat. No. 6,614,778.

(30) Foreign Application Priority Data

Apr. 2, 1998 (KR) ............................... 1998-11671

(51) Int. Cl.
  *H04J 3/00* (2006.01)
  *H04B 7/212* (2006.01)
  *H04J 3/24* (2006.01)
  *H04L 12/43* (2006.01)
  *H04J 3/16* (2006.01)
  *H04W 72/00* (2009.01)

(52) U.S. Cl. ..................... 370/280; 370/348; 370/349; 370/458; 370/468; 370/471; 455/450

(58) Field of Classification Search ................. 370/345, 370/347, 348–349, 392, 469–472, 474–476
See application file for complete search history.

(56) References Cited

U.S. PATENT DOCUMENTS 5,361,399 A    11/1994 Linquist et al. ............. 455/412
(Continued)

FOREIGN PATENT DOCUMENTS

EP    0 687 078 A2    12/1995

OTHER PUBLICATIONS

Lan Chen, Dynamic Timeslot Allocation Algorithms Suitable for Asymmetric Traffic in Multimedia TDMA/TDD Cellular Radio, 1998, IEEE, 1424-1428.*

(Continued)

*Primary Examiner*—Seema S Rao
*Assistant Examiner*—Christine Duong
(74) *Attorney, Agent, or Firm*—Lee, Hong, Degerman, Kang & Waimey

(57) ABSTRACT

Method of communication between a mobile station and a base station in a mobile communication system of IMT-2000 communication network basis, which is suitable for effective transmission of various multimedia information within a given channel capacity, the method including the steps of (1) when a mobile station receives a data transmission request, providing one portion of a period of a data frame with regular number and arrangement of down link slots and up link slots and the other portion of the data frame with irregular number and arrangement of down link slots or/and up link slots depending on characteristics and amount of subscriber data to be transmitted, (2) determining a transmission type according to which a communication is executed using a competition period for determining priorities of the subscriber data, a reservation period for making a reservation for time slots for use in transmission of the subscriber data, and an assignment period for assigning a memory period according to an amount of the subscriber data, which periods are selectively and respectively included in the one portion of the data frame and in the other portion of the data frame, and (3) providing the data frame according to the transmission type and transmitting to the base station.

5 Claims, 4 Drawing Sheets

U.S. PATENT DOCUMENTS

| | | | | |
|---|---|---|---|---|
| 5,440,545 A | * | 8/1995 | Buchholz et al. | 370/426 |
| 5,537,414 A | * | 7/1996 | Takiyasu et al. | 370/347 |
| 5,541,924 A | * | 7/1996 | Tran et al. | 370/347 |
| 5,602,836 A | | 2/1997 | Papadopoulos et al. | 370/280 |
| 5,610,917 A | * | 3/1997 | Diachina | 370/469 |
| 5,680,398 A | | 10/1997 | Robinson | 370/276 |
| 5,710,762 A | | 1/1998 | Petranovich | 370/280 |
| 5,719,859 A | | 2/1998 | Kobayashi et al. | 370/347 |
| 5,729,534 A | | 3/1998 | Jokinen et al. | 370/280 |
| 5,729,541 A | * | 3/1998 | Hamalainen et al. | 370/337 |
| 5,754,537 A | * | 5/1998 | Jamal | 370/330 |
| 5,818,829 A | | 10/1998 | Raith et al. | 370/347 |
| 5,828,948 A | | 10/1998 | Almgren et al. | 455/450 |
| 5,881,829 A | | 3/1999 | Dimond et al. | |
| 5,953,344 A | | 9/1999 | Dail et al. | 370/443 |
| 6,016,311 A | | 1/2000 | Gilbert et al. | 370/280 |
| 6,065,046 A | * | 5/2000 | Feinberg et al. | 709/216 |
| 6,144,645 A | | 11/2000 | Struhsaker et al. | 370/280 |
| 6,334,057 B1 | | 12/2001 | Malmgren et al. | 370/329 |
| 6,381,229 B1 | | 4/2002 | Narvinger et al. | 370/328 |
| 2004/0109434 A1 | * | 6/2004 | Hwang | 370/345 |
| 2004/0120302 A1 | * | 6/2004 | Sebire et al. | 370/347 |

OTHER PUBLICATIONS

J.M. Devile, A Reservation Based Multiple Access Scheme for a future universal mobile telecommunication system, 1993, IEE, 210-215.*

* cited by examiner

METHOD OF COMMUNICATION BETWEEN MOBILE STATION AND BASE STATION IN MOBILE COMMUNICATION SYSTEM

This application is a Continuation of application Ser. No. 09/280,849 filed Mar. 30, 1999, for which U.S. Pat. No. 6,614,778 B1 was issued on Sep. 2, 2003.

BACKGROUND OF THE INVENTION

1. Field of the Invention

The present invention relates to a method of communication between a mobile station and a base station in a mobile communication system, and more particularly, to a method of communication between a mobile station and a base station in a mobile communication system of IMT-2000 communication network basis, which is suitable for effective transmission of various multimedia information within a given channel capacity.

2. Background of the Invention

In general, there are bidirectional transmission and unidirectional transmission in signal transmission between a base station and a mobile station in the mobile communication system. In the bidirectional transmission, a plurality of forward time slots and backward time slots are alternatively assigned to a communication channel established between the mobile station and the base station, for transmission of data in time slot units assigned to a same time. The time slot means a time interval of information transmission on the communication channel. In the present invention, the time slot for use in information transmission from the base station to the mobile station is called as down link slot, and the time slot for use in information transmission from the mobile station to the base station is called as an up link slot.

FIG. 1 illustrates an architecture of down link slots and up link slots of a bidirectional communication in a related art mobile communication system.

Referring to FIG. 1, data frames are transmitted in a forward or backward direction during time slots S1~S4 assigned in advance. That is, the data frames are transmitted between the mobile station and the base station continuously alternating the down link slot S1 and S3 and the up link slots S2 and S4. That is, the data frames produced at the base station or the mobile station are transmitted repeatedly alternating assigned down link slots and up link slots. This type of signal transmission has been developed on the assumption that the mobile communication network serves for a speech data transmission in which a ratio of data transmission between a transmission side and a reception side is 1:1. Due to this reason, a trend is kept on, in which the down link slots and the up link slots are assigned simply at an equal ratio to most of current mobile communication devices. However, in a mobile communication service of IMT-2000 communication network basis, not only speech services, but also a variety of multimedia services, such as internet service and image broadcasting service are provided. In the internet or image service, an asymmetric transmission system is employed, in which an amount of data is transmitted in down link slots is relatively greater than an amount of data transmitted in up link slots, resulting to use slots of one direction of the down or up link slots continuously while slots of the other direction are almost not used in a case the multimedia service is given using a communication network having the down link slots and the up link slots assigned equally. In such a case, there is a problem that a capacity of a given channel is not used effectively. Consequently, to match to such an asymmetric transmission system, a TDD (Time Division Duplex) system is suggested, in which different numbers of down link slots and up link slots are assigned. That is, numbers of down link slots and up link slots are varied with amounts of data.

However, the TDD system has many problems in practical applications. The greatest problems are that random access and synchronization acquisition are difficult because periods of the mobile station and the base station which have regular down link slots and up link slots are not known in advance when the mobile station attempts to start an initial communication. In order to solve such problems, as shown in FIG. 2, an improved TDD system is suggested, which employs both a static period (TDD1) having down link slots and up links slots assigned therein in a regular alternation and a dynamic period (TDD2) having down link slots and up link slots irregularly assigned therein according to amount of the data to be transmitted. In the improved TDD system, the problems of random access and the synchronization acquisition between the mobile station and the base station can be easily solved by using the static period (TDD 1). And, since a communication can be made by providing numbers of down link slots and up link slots in the dynamic period (TDD2) varied with an amount of data, a given channel capacity can be used, effectively.

Thus, the static period (TDD1) in which the down link slots and the up link slots are assigned alternatively is provided for solving the problems in random access and synchronization. However, there are no suggestions on standards or techniques which improve an efficiency of given channel capacity in cases when numerous subscribers require calls or hand-off almost at a time in a city center where many offices are concentrated or a business quarter where many people gather. Therefore, there is no appropriate way to solve the problem when a number of call or hand-off required on the same time exceeds the given channel capacity. Accordingly, a technique in need, which can maximize an efficiency of a given channel source in a case when there is an excessive number of call or hand-off requirements in the IMT-2000 communication network in which the multimedia service is provided.

SUMMARY OF THE INVENTION

Accordingly, the present invention is directed to a method of communication between a mobile station and a base station in a mobile communication system that substantially obviates one or more of the problems due to limitations and disadvantages of the related art.

An object of the present invention is to provide a method of communication between a mobile station and a base station in a mobile communication system of IMT-2000 communication network which can provide a variety of communication services, which allows an effective communication between mobile stations and a base station when numerous mobile stations require communication services at almost the same time.

Another object of the present invention is to provide a method of communication between a mobile station and a base station in a mobile communication system of IMT-2000 communication network which can provide a variety of communication services, which can provide a data frame structure that allows easy determination of transmission system depending on characteristic and amount of data to be transmitted when numerous mobile stations require communication services at almost the same time.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, the method of communication between a mobile station and a base station in a mobile communication system of IMT-2000 communication network basis, which is suitable for effective transmission of various multimedia information within a given channel capacity, the method including the steps of (1) when a mobile station receives a data transmission request, providing one portion of a period of a data frame with regular number and arrangement of down link slots and up link slots and the other portion of the data frame with irregular number and arrangement of down link slots or/and up link slots depending on characteristics and amount of subscriber data to be transmitted, (2) determining a transmission type according to which a communication is executed using a competition period for determining priorities of the subscriber data, a reservation period for making a reservation for time slots for use in transmission of the subscriber data, and an assignment period for assigning a memory period according to an amount of the subscriber data, which periods are selectively and respectively included in the one portion of the data frame and in the other portion of the data frame, and (3) providing the data frame according to the transmission type and transmitting to the base station.

In another aspect of the present invention, there is provided a structure of a data frame for use in communication between a mobile station and a base station in a mobile communication system, the data frame having a static period having at least one or more than down link slots and at least one or more than one up link slots, both assigned thereto regularly and alternatively and a dynamic period having down link slots and up link slots, both assigned thereto irregularly, the structure including a competition period for determining a priority of data to be transmitted from the mobile or the base station during each of the static period or the dynamic period, a reservation period for making a reservation for a slot for use in transmission of the data, an assignment period for assigning a memory period according to an amount of the data, wherein the competition period, the reservation period and the assignment period are provided selectively.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE PREFERRED EMBODIMENT

Figure 1:
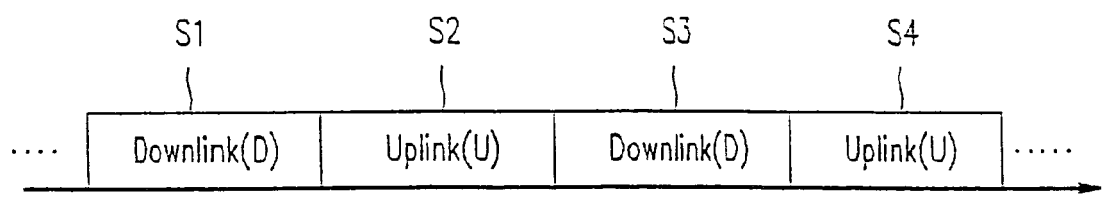
FIGS. 1 and 2 respectively illustrate architectures of down link slots and up link slots for use in a bidirectional communication in a related art mobile communication system.
Figure 2:
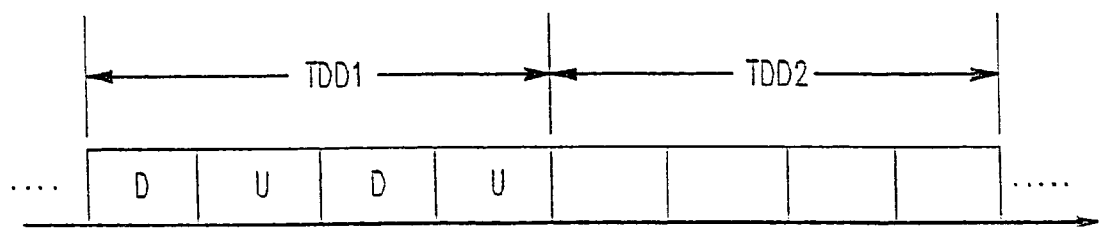
Figure 3:
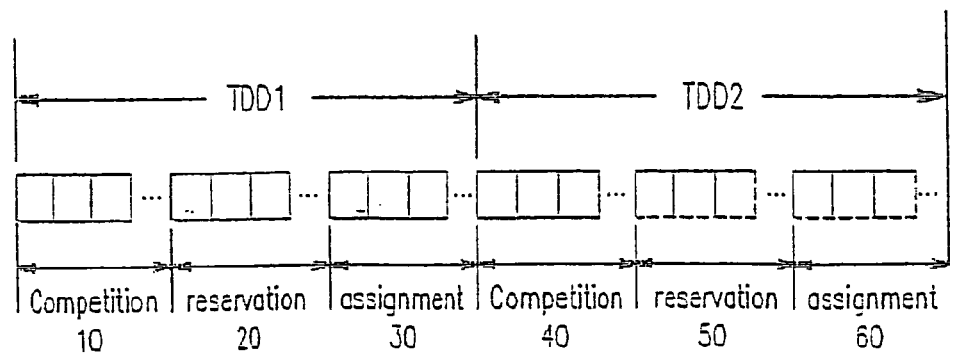
FIG. 3 illustrates an architecture of down link slots and up link slots each having a competition period, a reservation period and an assignment period in a data frame in accordance with a preferred embodiment of the present invention.

Reference will now be made in detail to the preferred embodiments of the present invention, examples of which are illustrated in the accompanying drawings. FIG. 3 illustrates an architecture of down link slots and up link slots each having a competition period, a reservation period and an assignment period in a data frame in accordance with a preferred embodiment of the present invention.

Referring to FIG. 3, the data frame in accordance with a preferred embodiment of the present invention includes a static period (TDD1) and a dynamic period (TDD2) each having a competition period 10 and 40 for determining priorities of subscriber data, a reservation period 20 and 50 for making a reservation for time slots for use in transmission of subscriber data, and an assignment period 30 and 60 for assigning a memory period according to an amount of subscriber data. In each of the competition period 10, the reservation period 20, and the assignment period 30 in the static period (TDD1), there are pluralities of down link slots and up link slots assigned therein in a regular alternation for representing characteristics of a data to be transmitted, and in each of the competition period 40, the reservation period 50, and the assignment period 60 in the dynamic period (TDD2), there are pluralities of down link slots and up link slots irregularly assigned therein according to kind and amount of data to be transmitted. Here, a number of slots assigned to each of the static period TDD1 and the dynamic period TDD2 in one data frame may vary under the control of an MAC (Medium Access Control) layer in the communication system. The competition period 10 and 40, the reservation period 20 and 50 and the assignment period 30 and 60 may be provided selectively in the static period (TDD1) and the dynamic period (TDD2) as necessary. If priorities are given to the competition period 10 and 40, the reservation period 20 and 50 and the assignment period 30 and 60, the priorities are the reservation period, the assignment period and the competition period. In the channel for transmission of the foregoing data frame, there are PSCH (Packet Signal Channel), PDCH (Packet Data Channel) and PCCH (Packet Control Channel), which may be selectively provided to the reservation period, the assignment period and the competition period. The PSCH is a channel for transmission/reception of a signaling message in transmission of a packet data, the PDCH is a channel for direct transmission/reception of a packet data to be transmitted. The PDCH is also used for requesting time slots for transmission of packets and for transmission of data related to the request. The PCCH is a channel for use in transmission/reception of a control data for identifying the packet data in transmission/reception of the packet data, and also used in assigning time slots for transmission of the packet data and for transmission of data related to the assignment.

Figure 4:
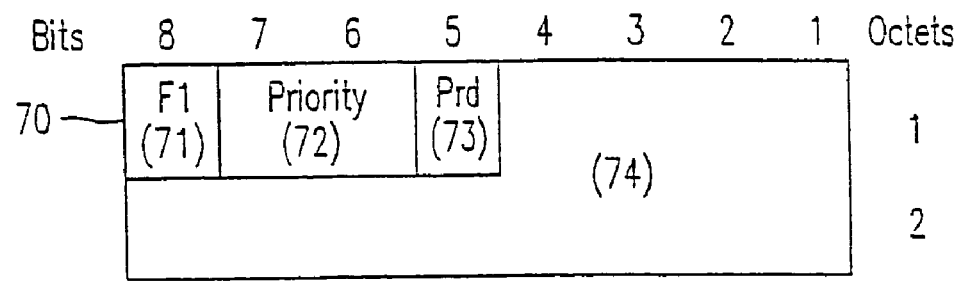
FIG. 4 illustrates an architecture of data frame transmitted through an up link slot in accordance with a first preferred embodiment of the present invention.

FIG. 4 illustrates an architecture of data frame transmitted through an up link slot in accordance with a first preferred embodiment of the present invention.

Referring to FIG. 4, the data frame transmitted through an up link slot in accordance with a first preferred embodiment of the present invention includes an FI (Frame indicator) parameter 71 for representing a content of data frame, a priority parameter 72 for representing a priority on a data frame processing, a prd (periodic) parameter 73 for representing a periodicity or non-periodicity in requesting time slots, a COR (Content of Request) parameter 74 for representing information related to a number of required slots or a periodicity of slot request in requesting the slots. The different parameters 71~74 contained in the data frame 70 may be removed, or another parameter may be added as necessary. As shown in FIG. 4, the data frames transmitted through the up link slot are assigned in octet units each with 8 bits. Of one bit assigned to the FI parameter 71, if the one bit is "0", it represents that the data frame is a pure packet data, if "1", it represents that the data frame is a request for a packet data and a time slot. Of two bits assigned to the priority parameter 72, if the two bits is "00", it represents a data frame of an initial transmission packet, if "01", it represents a data frame of a re-transmission packet, if "10", it represents a data frame of continuous packets. Of one bit assigned to the prd parameter 73, if the one bit is "0", it represents that the time slot request is periodic and if "1", it represents that the time slot request is not periodic. And, a number of bits assigned to the COR parameter 74, representing information related to a number of required slots or a periodicity of slot request in requesting the slots, may be varied.

Figure 5:
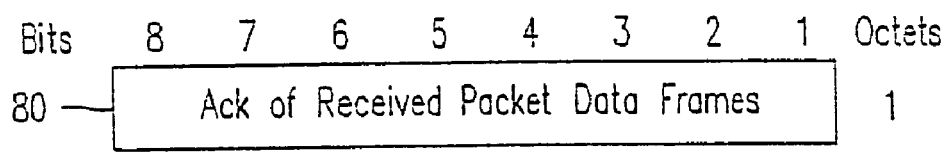
FIG. 5 illustrates an architecture of control frame transmitted through an up link slot in accordance with a first preferred embodiment of the present invention.

FIG. 5 illustrates an architecture of control frame transmitted through an up link slot in accordance with a first preferred embodiment of the present invention.

Referring to FIG. 5, there is a parameter (Ack of Received Packet Data Frame) 80 which represents confirmation of reception up to eight packet data frames assigned to the control frame transmitted through the up link slot. If a bit assigned to the parameter is "0", it represents that a confirmation of reception is made, if "1", it represents that a confirmation of reception is not made. For example, if the parameter is "0100 1001", it represents that a second, a fifth and a last packet data frames are not received, properly.

Figure 6:
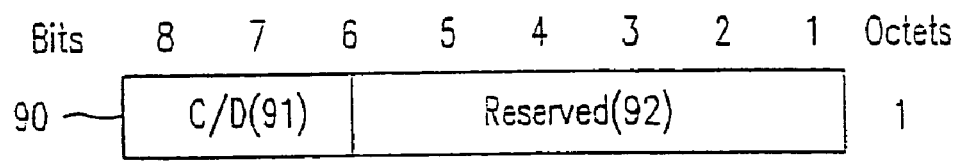
FIG. 6 illustrates an architecture of data frame transmitted through a down link slot in accordance with a first preferred embodiment of the present invention; and, FIGS. 7 and 8 illustrate a flow chart showing a communication procedure between a mobile station and a base station in accordance with another embodiment of the present invention.

FIG. 6 illustrates an architecture of data frame transmitted through a down link slot in accordance with a first preferred embodiment of the present invention.

Referring to FIG. 6, the data frame 90 transmitted through a down link slot has total 8 bits assigned thereto and includes a control frame period 91 and a data frame period 92. The control frame period 91 has 2 bits assigned thereto for selectively representing a frame on the down link slot of being a packet data frame, a packet control frame, or a mixed frame of the packet data frame and the packet control frame. If the control frame period 91 is represented by "00", it indicates that the frame on the down link slot is the packet data frame, if represented by "01", it indicates that the packet frame on the down link slot is the packet control frame, if represented by "10", it indicates that the packet frame on the down link slot is the mixed frame of the packet data frame and the packet control frame.

Figure 7:
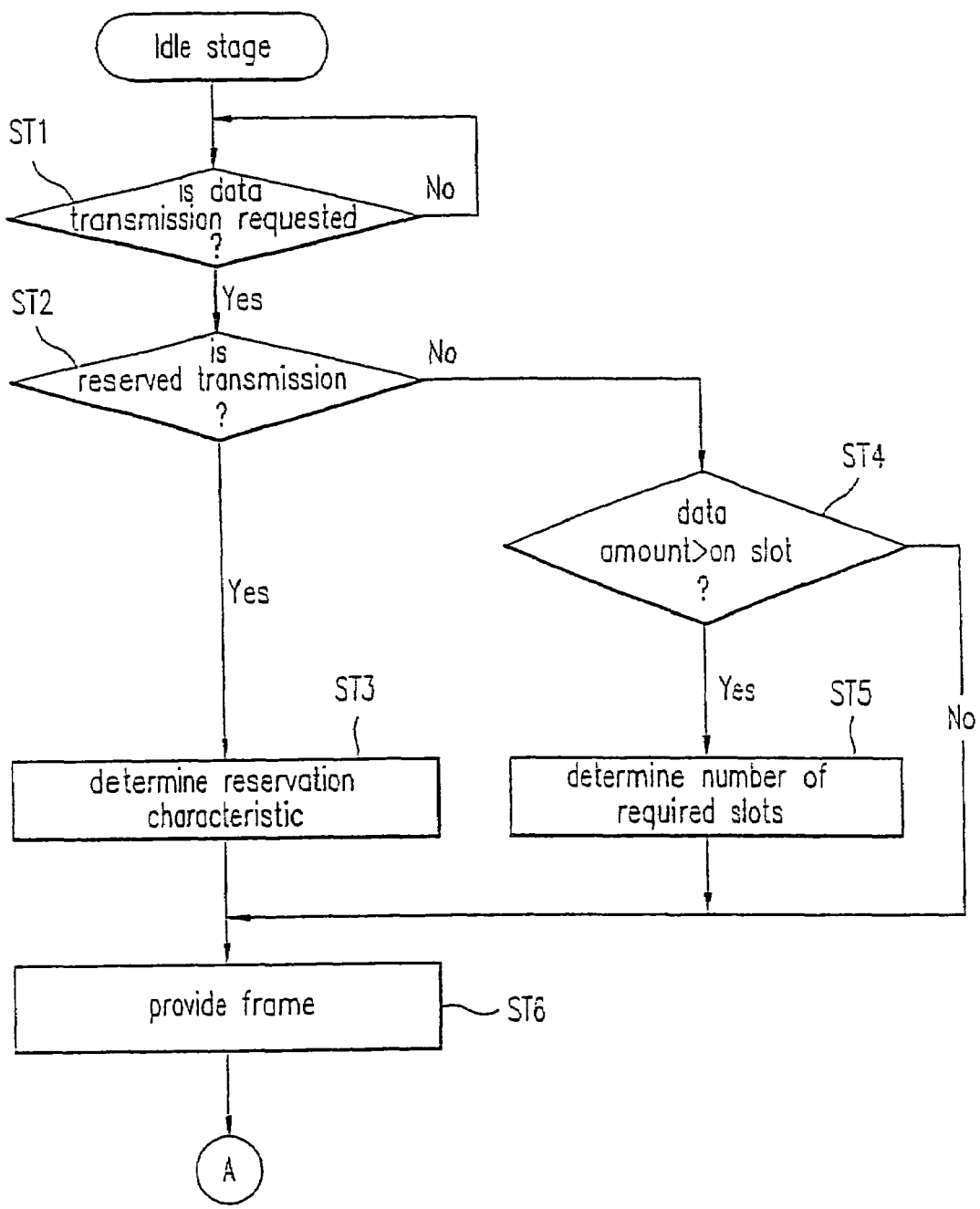
Figure 8:
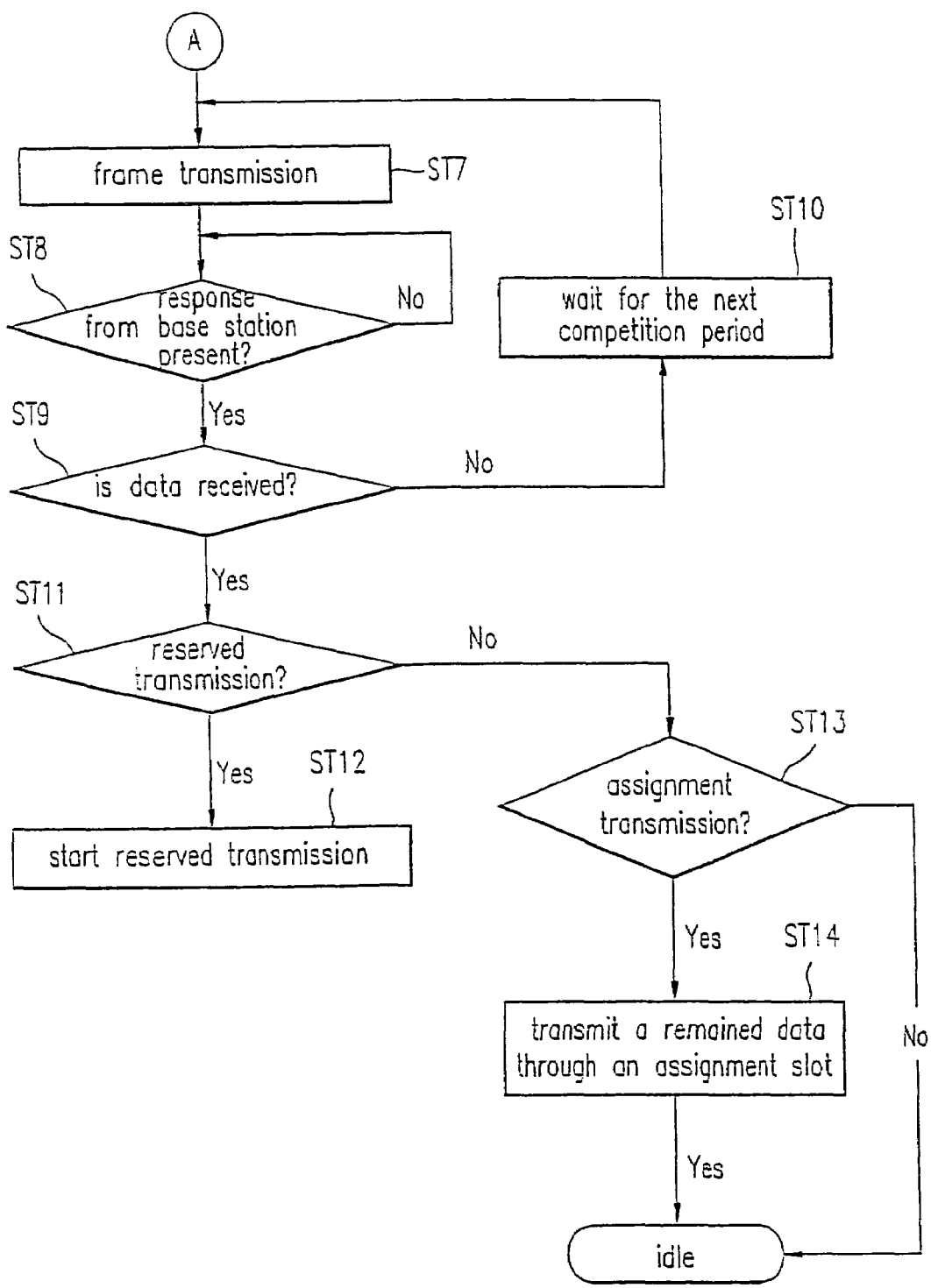

FIGS. 7 and 8 illustrate a flow chart showing a communication procedure between a mobile station and a base station in accordance with another embodiment of the present invention.

Referring to FIGS. 7 and 8, each mobile station determines if there is a request for data transmission from the subscriber at preset intervals (ST1). If there is the data transmission request from the subscriber as a result of the determination, the mobile station determines if the subscriber data to be transmitted is a reservation transmission (ST2). If it is the reservation transmission as a result of the determination (ST2), reservation characteristics are determined (ST3). The reservation characteristics are a period and a size of a reserved slot. However, if it is not the reservation transmission as a result of the determination (ST2), it is determined that a data to be transmitted has a quantity that can be transmitted through one time slot (ST4). If impossible, a number of time slots required for transmission of entire data is determined (ST5). Thus, after determining the data to be transmitted in a reservation transmission, an assignment transmission, or a competition transmission, the mobile station forms a data frame according to a determined transmission type and transmits the data to the base station (ST6 and ST7). Then, the mobile station determines if there is a response from the base station which may have received the data transmitted (ST8). In this instance, the base station determines if there is a data frame received from the mobile station during every competition period (ST9). If there is no data frame received from the mobile station as a result of the determination in the determination step (ST9), the base stations stands by the next competition period (ST10). However, if there is a data frame received from the mobile station as the result of the determination in the determination step (ST9), the base station examines characteristics of the received data frame. That is, the received data frame is determined of being transmitted in a reservation transmission (ST11). If it is a transmission in the reservation transmission, the reservation transmission is started (ST12), and if not, the received data frame is determined of being transmitted in an assignment transmission (ST13). If it is the assignment transmission as a result of the determination step (ST13), a remained data is transmitted through an assigned slot and an idle state is restored. However, if it is not the assignment transmission as a result of the determination step (ST13), the idle state is restored, directly.

As has been explained, the method of communication between a mobile station and a base station in a mobile communication system of IMT-2000 communication network basis that provides a variety of multimedia services having speech signals and image signals composited therein allows an effective transmission of data according to a transmission type determined according to service options for the mobile station. Therefore, a communication service can be provided, in which a given channel capacity can be maximized even in a case when subscribers to the mobile stations within a certain region request for data transmission at substantially the same time.

It will be apparent to those skilled in the art that various modifications and variations can be made in the method of communication between a mobile station and a base station in a mobile communication system of the present invention without departing from the spirit or scope of the invention. Thus, it is intended that the present invention cover the modifications and variations of this invention provided they come within the scope of the appended claims and their equivalents.

What is claimed is:

1. A method for transmitting a data frame having a header portion and a data portion from a mobile station to a base station, the method comprising:

assigning a first field of the header portion to indicate whether the data frame has a request of a time resource while data included in the data portion is transmitted simultaneously with the request, wherein the first field has a first logic value when the data frame has the request of the time resource;

assigning a second field of the header portion to identify an amount of the time resource requested when the first field has the first logic value;

assigning a third field of the header portion to contain a priority parameter representing control information related to at least one of a fragmentation and a retransmission; and transmitting the data frame at one transmission interval to the base station.

2. A station operable within a wireless communication system, the station comprising:

a data frame generator configured to form a data frame, the data frame comprising a header portion and a data portion wherein the header portion further comprises a first field to indicate whether the data frame has a time resource request while data included in the data portion is transmitted simultaneously with the time resource request, the first field having a first logic value when the data frame has the request of the time resource;

a second field to identify an amount of the time resource requested when the first field has the first logic value;

a third field to contain a priority parameter representing control information related to at least one of a fragmentation and a retransmission; and a transmitter for transmitting the data frame at one transmission interval to a base station.

3. A method of transmitting data from a mobile station to a network in a wireless communication system, the method comprising:

transmitting a data frame comprising a time resource request and data at a first transmission interval, the data frame comprising a header portion and a data portion, wherein the header portion has at least a first field having a first logic value to indicate to the network that the data frame has the time resource request while the data is transmitted simultaneously with the time resource request, a second field to identify an amount of time resource required when the first field has the first logic value, and a third field to contain a priority parameter representing control information related to at least one of a fragmentation and a retransmission;

receiving a time resource allocation responsive to the time resource request; and transmitting the data frame within the allocated time resource at a second transmission interval.

4. A method of transmitting data in a wireless communication system, the method comprising:

forming a data frame in a mobile station having a header portion and a data portion, wherein the header portion has at least a first field to indicate to a network whether the data frame has a time resource request while the data included in the data portion is transmitted simultaneously with the time resource request, the first field having a first logic value when the data frame has the time resource request, a second field to identify an amount of time resource required when the first field has the first logic value, and a third field to contain a priority parameter representing control information related to at least one of a fragmentation and a retransmission;

transmitting the data frame at a first transmission interval to the network;

allocating, by the network, the time resource responsive to the time resource request;

receiving an indication at the mobile station of the allocated time resource; and transmitting the data frame from the mobile station to the network at a second transmission interval.

5. A method for transmitting a data frame from a mobile station to a network, the method comprising;

forming the data frame, wherein the data frame comprises a header portion and a data portion, and wherein the header portion further comprises a first field to indicate to the network whether the data frame has a time resource request while data included in the data portion is transmitted simultaneously with the time resource request, the first field having a first logic value when the data frame has the time resource request, a second field to identify an amount of time resource required when the first field has the first logic value, and a third field to contain priority parameter representing control information related to at least one of a fragment and a retransmission; and transmitting the data frame at one transmission interval to a base station.

* * * * *